US009547716B2

United States Patent
Kim

(10) Patent No.: US 9,547,716 B2
(45) Date of Patent: *Jan. 17, 2017

(54) DISPLAYING ADDITIONAL DATA ABOUT OUTPUTTED MEDIA DATA BY A DISPLAY DEVICE FOR A SPEECH SEARCH COMMAND

(71) Applicant: LG ELECTRONICS INC., Seoul (KR)

(72) Inventor: Yongsin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 479 days.

This patent is subject to a terminal disclaimer.

(21) Appl. No.: 13/953,313

(22) Filed: Jul. 29, 2013

(65) Prior Publication Data

US 2014/0067402 A1 Mar. 6, 2014

Related U.S. Application Data

(63) Continuation of application No. 13/761,102, filed on Feb. 6, 2013, now Pat. No. 8,521,531.

(30) Foreign Application Priority Data

Aug. 29, 2012 (KR) .................. 10-2012-0095034

(51) Int. Cl.
*G06F 17/30* (2006.01)
*G10L 15/22* (2006.01)
(Continued)

(52) U.S. Cl.
CPC ... *G06F 17/30755* (2013.01); *G06F 17/30796* (2013.01); *G06F 17/30967* (2013.01);
(Continued)

(58) Field of Classification Search
CPC .............. G10L 15/08; G10L 2015/088; G10L 2015/228; G06F 17/30; G06F 17/30017; G06F 17/30023; G06F 17/30026; G06F 17/3074; G06F 17/30749; G06F 17/30755; G06F 17/30796
(Continued)

(56) References Cited

U.S. PATENT DOCUMENTS

| 5,835,667 A | 11/1998 | Wactlar et al. |
| 6,480,819 B1 | 11/2002 | Boman et al. |

(Continued)

FOREIGN PATENT DOCUMENTS

| JP | 2007-81768 A | 3/2007 |
| JP | 2011-199698 A | 10/2011 |

*Primary Examiner* — Martin Lerner
(74) *Attorney, Agent, or Firm* — Birch, Stewart, Kolasch & Birch, LLP

(57) ABSTRACT

A speech search method performed by a display device, the method including outputting media data including audio data, receiving a speech search command for additional data about the outputted media data from a user, the speech search command including at least one query word, determining whether the at least one query word matches a query term that is full and searchable, when the at least one query word matches the query term that is full and searchable, performing a search for the additional data using the query term, and when the at least one query word does not match the query term that is full and searchable, determining the query term from a predetermined amount of the audio data prior to receiving the speech search command and performing the search for the additional data using the query term.

16 Claims, 9 Drawing Sheets

(51) Int. Cl.
  *H04N 21/422* (2011.01)
  *H04N 21/472* (2011.01)
  *G10L 15/26* (2006.01)

(52) U.S. Cl.
  CPC .............. *G10L 15/22* (2013.01); *G10L 15/26* (2013.01); *G10L 2015/228* (2013.01); *H04N 21/42203* (2013.01); *H04N 21/472* (2013.01)

(58) Field of Classification Search
  USPC ........ 704/231, 251, 252, 254, 270; 707/725, 707/758, 760; 725/53
  See application file for complete search history.

(56) References Cited

U.S. PATENT DOCUMENTS

| | | | |
|---|---|---|---|
| 6,941,268 B2 | 9/2005 | Porter et al. | |
| 7,272,558 B1 | 9/2007 | Soucy et al. | |
| 7,505,907 B2 | 3/2009 | Carro | |
| 7,685,620 B2 | 3/2010 | Fellenstein et al. | |
| 7,698,134 B2 | 4/2010 | Nomura | |
| 7,814,526 B1 | 10/2010 | Harvey et al. | |
| 7,865,367 B2 | 1/2011 | Carro | |
| 7,950,033 B2 | 5/2011 | Pierre et al. | |
| 8,015,013 B2* | 9/2011 | Chiu ..................... G06F 17/275 704/270 | |
| 8,019,604 B2* | 9/2011 | Ma ..................... G06F 17/30746 704/242 | |
| 8,209,724 B2 | 6/2012 | Rathod et al. | |
| 8,296,141 B2 | 10/2012 | Gilbert et al. | |
| 8,316,014 B2 | 11/2012 | Endo et al. | |
| 8,510,317 B2* | 8/2013 | Boetje ................ G06F 17/30026 707/755 | |
| 8,521,531 B1* | 8/2013 | Kim ........................ G10L 15/22 704/252 | |
| 8,751,690 B2* | 6/2014 | Shah ................. G06F 17/30026 709/203 | |
| 2003/0115057 A1* | 6/2003 | Junqua ..................... G10L 15/24 704/235 | |
| 2004/0078814 A1 | 4/2004 | Allen | |
| 2006/0041926 A1 | 2/2006 | Istvan et al. | |
| 2007/0225970 A1 | 9/2007 | Kady et al. | |
| 2008/0059522 A1 | 3/2008 | Li et al. | |
| 2008/0270110 A1 | 10/2008 | Yurick et al. | |
| 2008/0270138 A1 | 10/2008 | Knight et al. | |
| 2009/0063151 A1* | 3/2009 | Arrowood ......... G06F 17/30746 704/254 | |
| 2009/0150159 A1* | 6/2009 | Ahlin ................ G06F 17/30026 704/275 | |
| 2009/0240674 A1 | 9/2009 | Wilde et al. | |
| 2009/0276417 A1* | 11/2009 | Shapira .............. G06F 17/30746 | |
| 2010/0145938 A1* | 6/2010 | Boetje ................ G06F 17/30026 707/736 | |
| 2010/0169929 A1 | 7/2010 | Choi et al. | |
| 2010/0274667 A1* | 10/2010 | Lanham ............ G06F 17/30026 704/201 | |
| 2010/0286984 A1* | 11/2010 | Wandinger .............. G10L 15/04 704/251 | |
| 2011/0069230 A1 | 3/2011 | Polumbus et al. | |
| 2011/0225147 A1 | 9/2011 | Shin et al. | |
| 2011/0244919 A1 | 10/2011 | Aller et al. | |
| 2011/0270877 A1 | 11/2011 | Kim | |
| 2011/0320197 A1* | 12/2011 | Conejero ............ G06F 17/3002 704/235 | |
| 2011/0321098 A1 | 12/2011 | Bangalore et al. | |
| 2012/0215533 A1* | 8/2012 | Aravamudan .... G06F 17/30253 704/235 | |
| 2013/0007043 A1 | 1/2013 | Phillips et al. | |
| 2013/0073534 A1 | 3/2013 | French | |
| 2014/0122059 A1* | 5/2014 | Patel ................ G06F 17/30017 704/235 | |
| 2015/0019203 A1* | 1/2015 | Smith ................ G06F 17/30796 704/9 | |
| 2015/0379094 A1* | 12/2015 | Ehlen ................ G06F 17/30554 707/722 | |

* cited by examiner

DISPLAYING ADDITIONAL DATA ABOUT OUTPUTTED MEDIA DATA BY A DISPLAY DEVICE FOR A SPEECH SEARCH COMMAND

CROSS REFERENCE TO RELATED APPLICATIONS

This application is a Continuation of application Ser. No. 13/761,102 filed on Feb. 6, 2013, now U.S. Pat. No. 8,521,531 issued on Aug. 27, 2013, which claims the benefit of Korean Application No. 10-2012-0095034, filed on Aug. 29, 2012. The entire contents of all of the above applications are hereby incorporated by reference.

BACKGROUND OF THE INVENTION

Field of the Invention

The present invention relates to a display device and more particularly, to a speech search method for a display device.

Discussion of Background Art

As network technology has improved, users can easily search a variety of information. Especially, the users can search for digital contents at the same time they view the digital contents using a display device. They can search for not only information about the contents themselves but also detailed information about a part of the contents that they are viewing or the object of the contents.

Searching for information about contents can be performed in various ways. Previously, the users inputted their search words by using additional input devices such as a keyboard. However, due to the improvements of the recent voice recognition technology, the users can input various voice commands to a device in order to control the device. Therefore, the users can search for information about contents using their voice commands at the same time they are viewing the contents.

SUMMARY OF THE INVENTION

Accordingly, the present invention is directed to a display device and a speech search method that substantially obviates one or more problems due to limitations and disadvantages of the related art.

An object of the present invention is to provide a method of searching desired information about contents using a speech search in a more efficient and accurate manner.

Another object of the present invention is to provide a speech search method that generates search results that a user intended to search using speech search commands and context information associated with media data being viewed by the user even when the user does not exactly know what he or she is trying to search.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a speech search method for a display device includes the steps of outputting media data, receiving a speech search command from a user, and determining whether the speech search command includes a user query term which is full and searchable. If the speech search command does not include a user query term which is full and searchable, the method further comprises the step of extracting a media query term which is full and searchable from audio data of the media data which is outputted immediately prior to the speech search command. Finally, the method includes the step of performing a speech search using the extracted media query term.

In another aspect of the present invention, a display device includes a media data processing module processing media data, a media data output unit outputting the processed media data, and an audio input unit receiving a speech search command from a user. The display device further includes a speech search module determining a query term from the speech search command and performing a speech search using the determined query term. The display device determines whether the speech search command includes a user query term which is full and searchable, extracts a media query term from audio data of the media data which is outputted immediately prior to the speech search command if the speech search command does not include a user query term, and performs a speech search using the extracted media query term.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The present invention relates to a display device performing a speech search and providing a user with a result of the speech search. A speech search is a technology that recognizes a user's voice command and performs a search with the user's voice command. A speech search utilizes a voice or speech recognition technology. The voice recognition technology in the present invention includes natural language processing. The natural language processing is a process that analyzes the type, meaning, and conversation of a normal everyday language and converts the result of the analysis for a device to process it. In other words, it is not a predetermined keyword that the device recognizes but a spontaneous conversation that it recognizes and it performs the processing according to a user's intention.

The display device according to the present invention can be any one of a variety of devices that can process and output digital media data or digital contents. The digital contents include at least one of text, audio, and video data. For example, the display device can be a TV, a set-top box, an internet processing device, a recorded media player, a media recording device, a wireless communication device, a cell phone, a Personal Digital Assistant ("PDA"), a computer, a laptop, and a tablet PC. In other words, the display device can be any one of a variety of devices providing a user with processed digital contents, and the display device may be referred to as "device" hereinafter.

Figure 1:
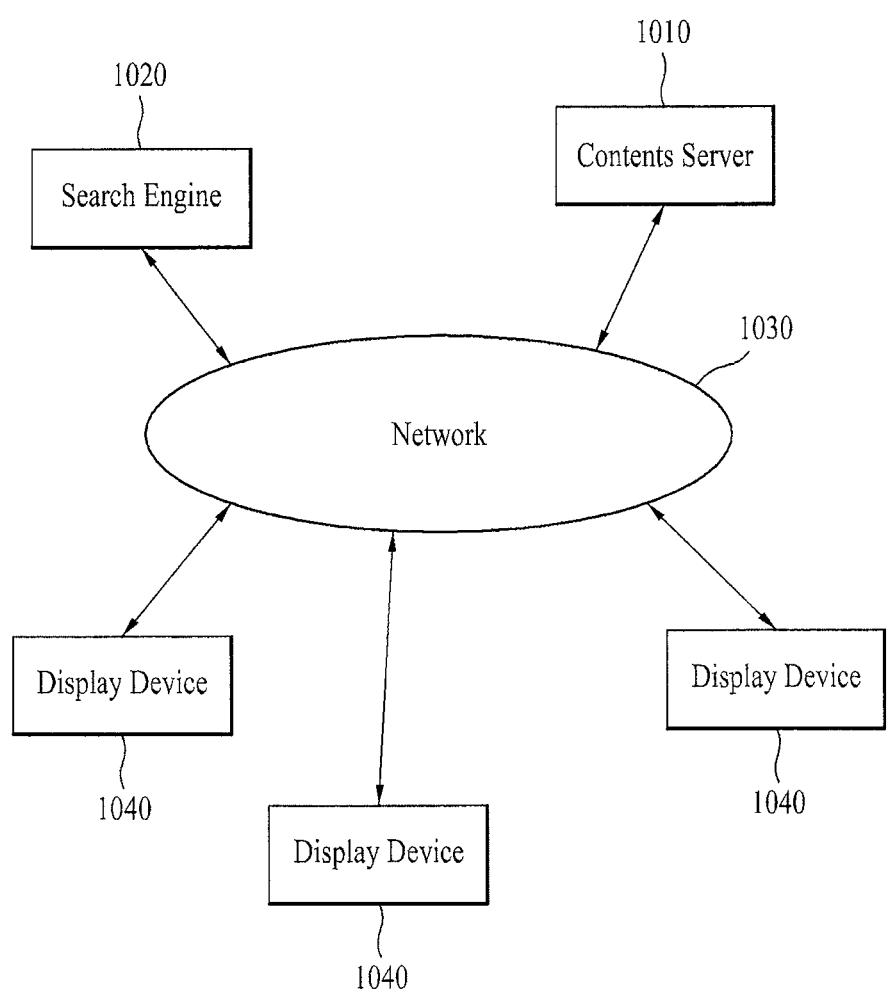
FIG. 1 illustrates a conceptual diagram of a network according to an embodiment of the present invention.

FIG. 1 shows a conceptual diagram of a network according to an embodiment of the present invention. As shown in FIG. 1, display devices 1040 are connected to a network 1030. The network 1030 is a network that transmits and receives data by using various communication protocols such as cable, wireless communication, optical communication, or IP network. The display devices 1040 receive contents from a contents server 1010 through the network 1030. The contents server 1010 is a contents provider providing digital contents, and the display device 1040 can be used as a contents server based on the network architecture.

The display device 1040 provides a user with the contents received from the contents server 1010. The display device 1040 provides contents by processing received contents data and displays the processed data. And the display device 1040 receives a search command from a user, transmits a search term to a search engine 1020, and provides a result of the search back to the user after receiving the result from the search engine 1020.

In the following, at least one searchable word which is a target of searching can be called "query term." Query term is an object to be searched by the search engine and includes at least one word. The display device 1040 may perform searching from a database included in the display device 1040 by using a query term or transmit the query term to the search engine 1020 and receive a result of the search. And at least one word included in query terms is called "query word." When the query term includes a plurality of words, each word can be called query word. If the query term only has one word, the query word is the query term. But, in the following, the query word is a word that a user indicates as the user speaks a speech search command. In other words, the user can speak a partial or unclear word and such a word can be recognized by the display device as the query word.

Figure 2:
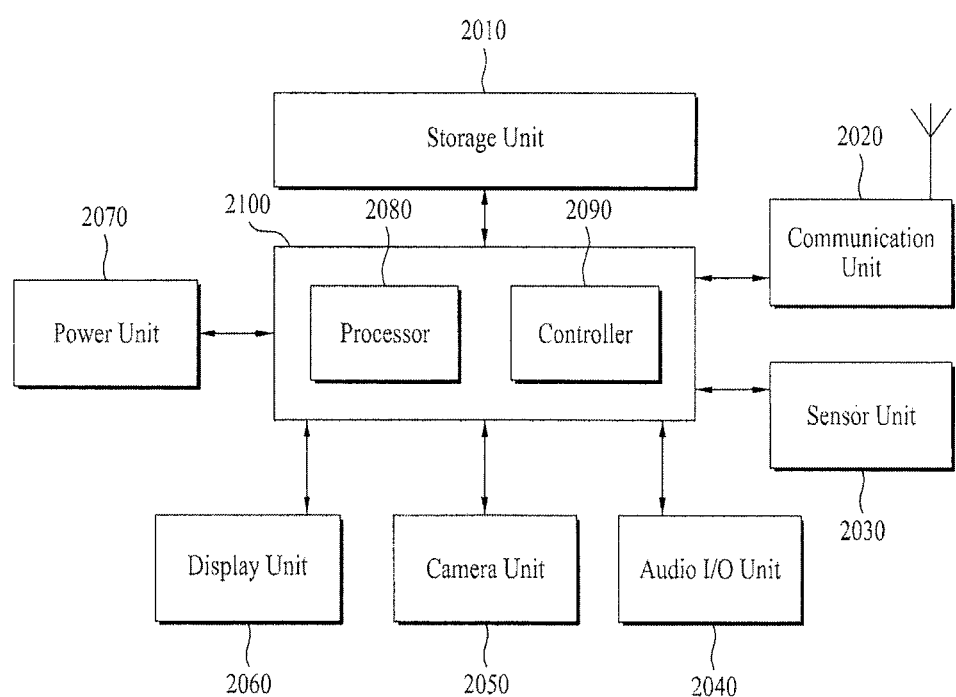
FIG. 2 illustrates a block diagram of a display device according to an embodiment of the present invention.

FIG. 2 shows a block diagram of a display device according to an embodiment of the present invention.

FIG. 2 indicates an example of the display device 1040 shown in FIG. 1 having a storage unit 2010, a communication unit 2020, a sensor unit 2030, an audio input/output unit 2040, a camera unit 2050, a display unit 2060, a power unit 2070, a processor 2080, and a controller 2090. The display device in FIG. 2 is shown as an example only and it is not required for all the units to be equipped as shown in FIG. 2. A structure block necessary for the display device according to an embodiment of the present invention will be described as follows.

The storage unit 2010 stores various digital data such as video, audio, picture, movie clips, and applications. The storage unit 2010 indicates a various digital data storage space for various digital data such as flash memory, Hard Disk Drive ("HDD"), and Solid State Drive ("SSD"). In the following, a buffer necessary for processing data can be included in the storage unit 2010. Also, the storage unit 2010 can store a database necessary for searching information.

The communication unit 2020 transmits and receives data and performs communications by using various protocols associated with the display device. The communication unit 2020 is connected to the external networks through wire or wirelessly, and transmits and receives digital data. In the present invention, the display device receives media data by using the communication unit 2020, or transmits a search query and receives the search result of the query.

The sensor unit 2030 may recognize a user's input or environment of the device by using a plurality of sensors and transmit to the controller 2090. The sensor unit 2030 can have a plurality of sensing means. As an embodiment, a plurality of sensing means can include gravity sensor, terrestrial magnetism sensor, motion sensor, gyro sensor, acceleration sensor, inclination sensor, brightness sensor, olfactory sensor, temperature sensor, depth sensor, pressure sensor, bending sensor, audio sensors, video sensor, Global Positioning System sensor ("GPS") sensors, and touch sensors. The term "sensor unit" 2030 is used to refer to all of the various sensing means. The sensor unit 2030 senses the user's various inputs and conditions, and transmits the result of the sensing for the device performing necessary functions based on the result of the sensing. The sensors may be included in the device as a different element or combined as at least one element. The sensor unit 2030 may be selectively equipped according to an embodiment.

The audio input/output unit 2040 includes an audio output means such as a speaker and an audio input means such as a microphone. The audio input/output unit 2040 may perform audio outputting of the device or audio inputting toward the device. The audio input/output unit 2040 can be used as an audio sensor. However, according to an embodiment of the present invention, when the display device does not include a speaker or a microphone (for example, when the display device is a set-top box), the audio input/output unit 2040 processes audio data and transmits the audio data to an external device, or receives audio data from the external device and processes it. An audio input unit and an audio output unit may be separately equipped and an embodiment will be illustrated as follows.

The camera unit 2050 records movie clips and takes pictures and may be selectively equipped according to an embodiment. The camera unit 2050 can be used as a motion sensor or a visual sensor as pre-described.

The display unit 2060 can output images on a display screen. If the display is a touch-sensitive display, the display unit 2060 can be used as a touch sensor. If the display or the device is flexible, they may be used as a bending sensor. However, according to an embodiment, if the display device does not include a display panel or a screen such as a set-top box and a computer, the display unit processes display data and transmits the display data to an external device like a monitor. The display unit 2060 may be called as a video output unit hereinafter.

The power unit 2070 provides power to the device as a power source connected with an internal battery or an external power.

The processor 2080 executes various applications stored in the storage unit 2010 and processes internal data in the device.

The controller 2090 controls the units of the device, and manages transmitting and receiving data between the units and the functions of each unit.

The processor 2080 and the controller 2090 may be combined in a single chip and implement the functions above-described. In that case, they may be called a control unit 2100. The speech search method of the present invention can be performed by the control unit 2100 and according to an embodiment, performed by modules controlled by the control unit 2100. Further illustration is as follows.

FIG. 2 is a block diagram of a display device according to an embodiment of the present invention, and the separately illustrated blocks are shown as the elements of the device. Thus, the elements of the device can be combined in one chip or a plurality of chips as designed.

In the following, a speech search method can be performed in the control unit 2100 in FIG. 2 and according to an embodiment, the speech search method can be executed by an application which is stored in the storage unit 2010 and operated by the control unit 2100. As for the performance of the control unit 2100 executing such a speech search, further description is to be followed. In addition, in other embodiments below, for the purpose of convenience to explain the present invention, a TV may be used as an example of the display device. However, as mentioned, it is obvious to a person ordinarily skilled in the art that the display device is not limited to only a TV.

Figure 3:
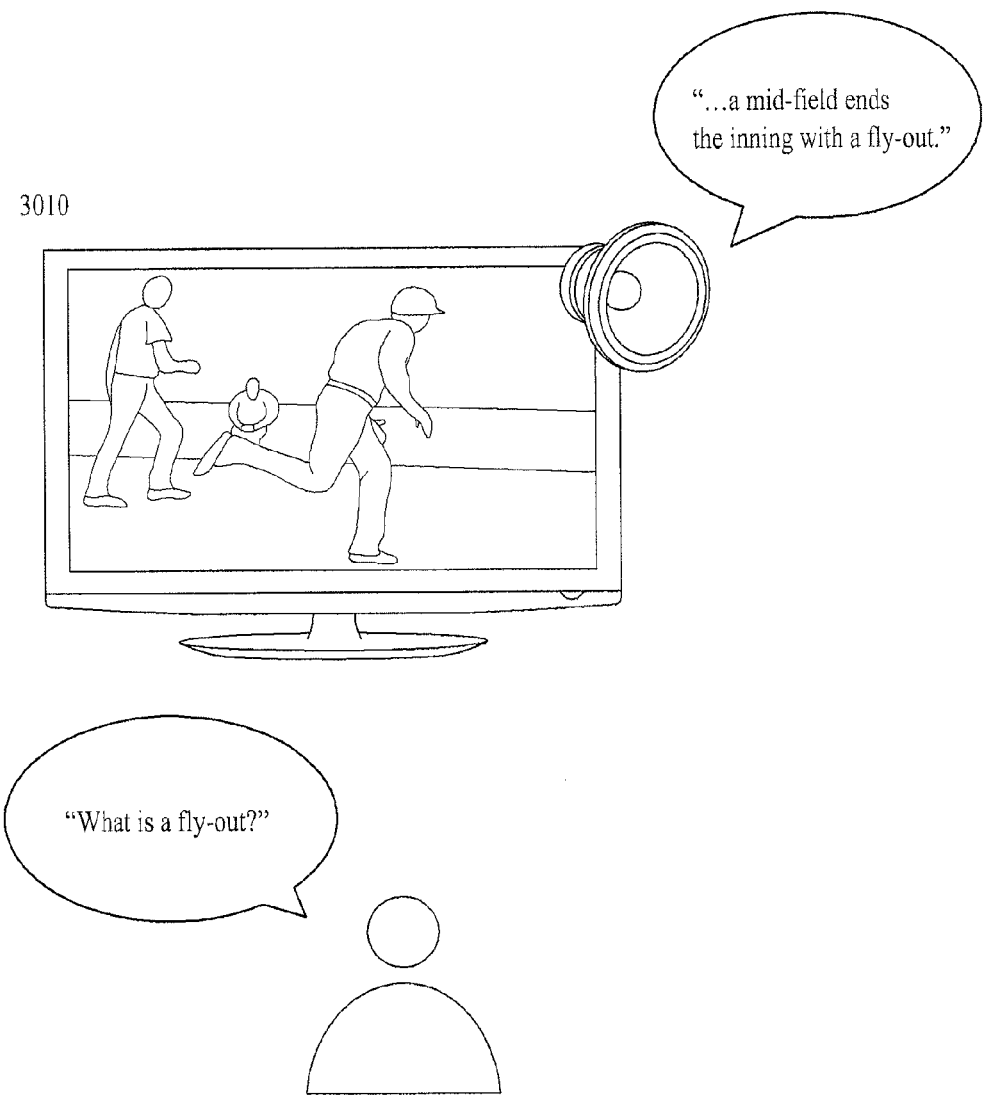
FIG. 3 illustrate a speech search method according to an embodiment of the present invention.

FIG. 3 shows a speech search method according to an embodiment of the present invention.

As an embodiment, a display device 3010 similar to display device 1040 outputs baseball contents as media data. The baseball contents may be received as live broadcast contents or may be pre-stored in the storage unit of the display device 3010. The media data, which are contents that the display device outputs, may include audio data and video data. The display device 3010 outputs video data through a display screen and audio data through a speaker.

A user watching the baseball contents by the display device 3010 can search information about the contents by voice. For example, for images being displayed on a screen, one can search information about a player or an unfamiliar word from the words that are spoken by the commentator. As shown in FIG. 3, if the commentator says ". . . a mid-fielder ends the inning with a fly-out" in the broadcast, the user might want to search for "fly-out." In that case, the user in the present invention can search for "fly-out" by a voice command. Especially, by using natural language processing, a normal everyday questioning statement like "What is a fly-out?" can start a speech search function.

Figure 4:
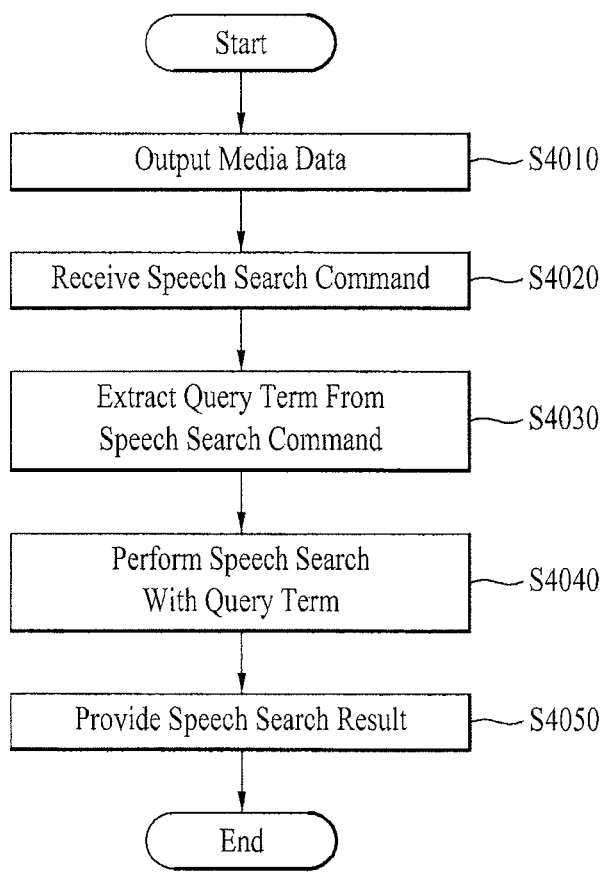
FIG. 4 illustrates a flowchart of a speech search method according to an embodiment of the present invention.

FIG. 4 shows a flowchart of a speech search method according to an embodiment of the present invention that may be performed by any device described herein.

The method begins when a display device outputs media data (S4010). As mentioned relative to FIG. 3, the media contents may include video data and audio data. Further, the media contents may include text data depending on contents.

The display device then receives a speech search command (S4020). The speech search command can be a predetermined command or a normal everyday language statement by using natural language processing. In the embodiment of FIG. 3, "What is a fly-out?" is a speech search command. Using voice-recognition technology, the display device receives the speech search command from the user's voice received via a microphone.

The display device extracts a query term from a speech search command (S4030). When the display device recognizes a speech search command from a user's voice, a query term which is the object of the search can be extracted from the speech search command. In the embodiment of FIG. 3, "fly-out" is a query term in the speech search command of "what is a fly-out?" That is, the display device recognizes the user's voice of "what is a fly-out?" as a speech search command, and extracts the query term, "fly-out," to process the search from the recognized speech search command.

In the following, words included in a speech search command are called, "query word." According to the embodiments of FIG. 3 and FIG. 4, "fly" and "out" are query words. Although the display device can search for a query word, a user might want to search for a combined query word, a query term, not for each query word. The display device can extract a query term by using voice-recognition and natural language processing. In that case, as for the extraction of the query term if there is only one query word, the query word is extracted and if there are a plurality of query words, combined query words, that is, a query term, is extracted. The extraction of query word can be performed based on the context information of media data. In the embodiments of FIG. 3 and FIG. 4, as the user is watching the baseball contents, the display device can determine whether the user wants to search for "fly" or "out" or "fly-out" as a baseball term. The use of context information allows the search to exclude searches for irrelevant synonyms (e.g., a search for information about the insect fly or the act of flying in a plane.)

The display device performs the speech search by using the extracted query term (S4040). The display device can search for query terms by using an internal search engine, or transmits query terms through a network to an external search engine having the search function and receives the result of the search. A search or a search result of a query term includes the definition of the term and diverse data related to contents which a user is watching.

The display device provides a user with a search result (S4050). The search result can be provided in various ways. For example, the display device provides the search result in audio or in display. In other words, the display device outputs the search result to a user in audio or in captions on the display screen.

However, in the embodiments of FIG. 3 and FIG. 4, a speech search command may not include a full query term. That is, if a query term is incomplete or ambiguous, a query term for searching may not be able to be extracted. Further illustration is as follows. In the following, the same technical descriptions as in FIG. 3 and FIG. 4 are not repeated.

Figure 5:
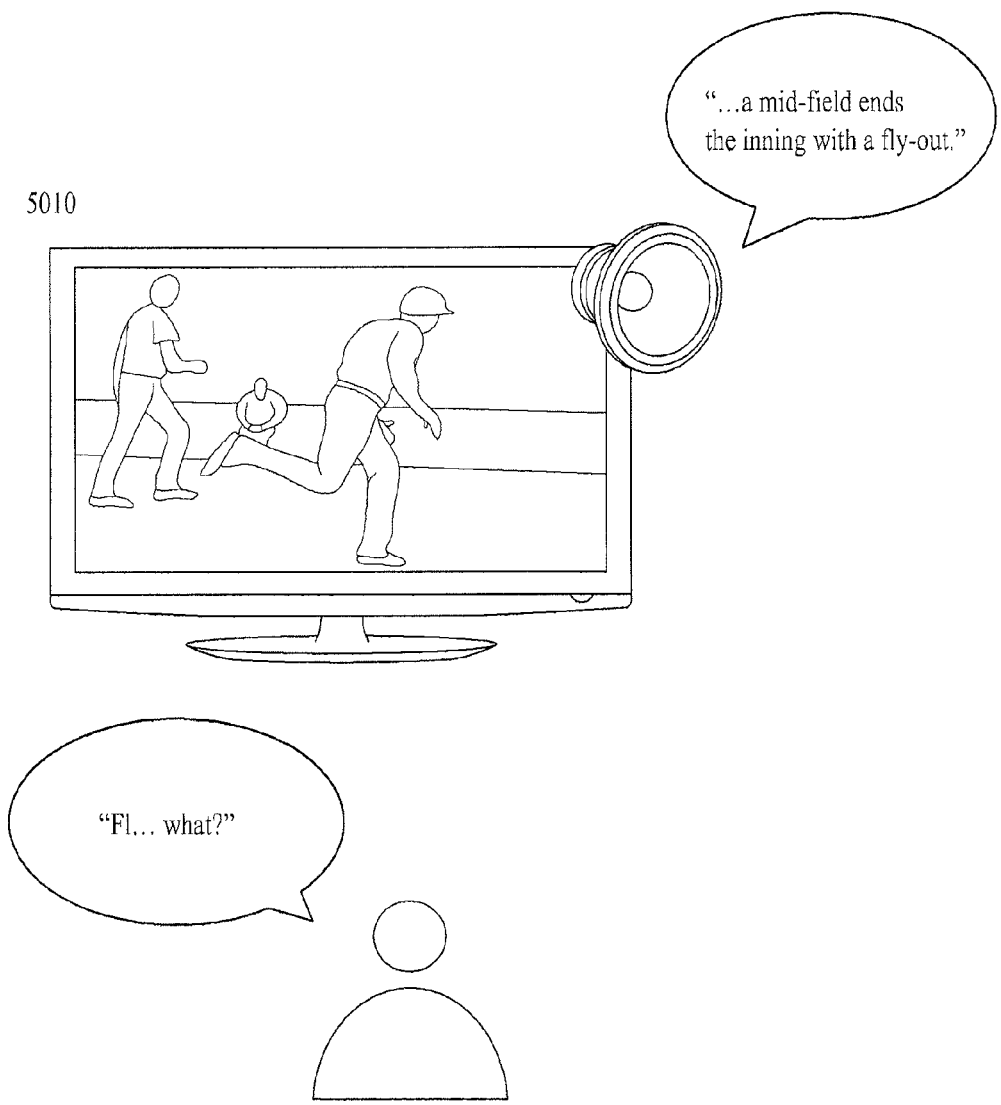
FIG. 5 illustrates a speech search method according to another embodiment of the present invention.

FIG. 5 is a speech search method according to another embodiment of the present invention.

As shown in FIG. 3, the display device outputs baseball contents as contents. The baseball contents may be received as live broadcast contents or be pre-stored in the storage unit of a display device 5010 similar to storage unit 2010. Contents that the display device outputs may include audio data and video data. The display device 5010 outputs video data through a display screen and audio data through a speaker.

A user watching the baseball contents by the display device 5010 can search information about the contents by voice. For example, for images being displayed on a screen, one can search information about a player or an unfamiliar word spoken by the commentator. As shown in FIG. 3, if the user says, " . . . a mid-fielder ends the inning with a fly-out" in the broadcast, the user might want to search for "fly-out." In that case, the user in the present invention can search for fly-out by a voice command. Especially, by using natural language processing, a normal everyday questioning statement like "What is a fly-out?" can start a speech search function.

However, when words in the audio data of the contents are searched, a user often wants to search using an unfamiliar word. In that case, it is often difficult for a user to accurately hear a word and to then command the search correctly. That is, as shown in FIG. 5, when the user does not know the word, "fly-out," it is often very difficult for the user to accurately give the right search command for "fly-out." Especially, unlike the video search, words included in audio data go away as they are outputted. Unless the words are outputted again, it is difficult to even know what they were. In other words, words included in audio data are temporarily short-lived, the probability of an inaccurate recognition of a search object is high compared to video data.

Thus, although the user shown in FIG. 3 and FIG. 4 could say an accurate speech command having an accurate query term like "what is a fly-out?," as shown in FIG. 5, the user might want the search engine to process for inaccurate words like "fl . . . what?" or "fly . . . what?"

Figure 6:
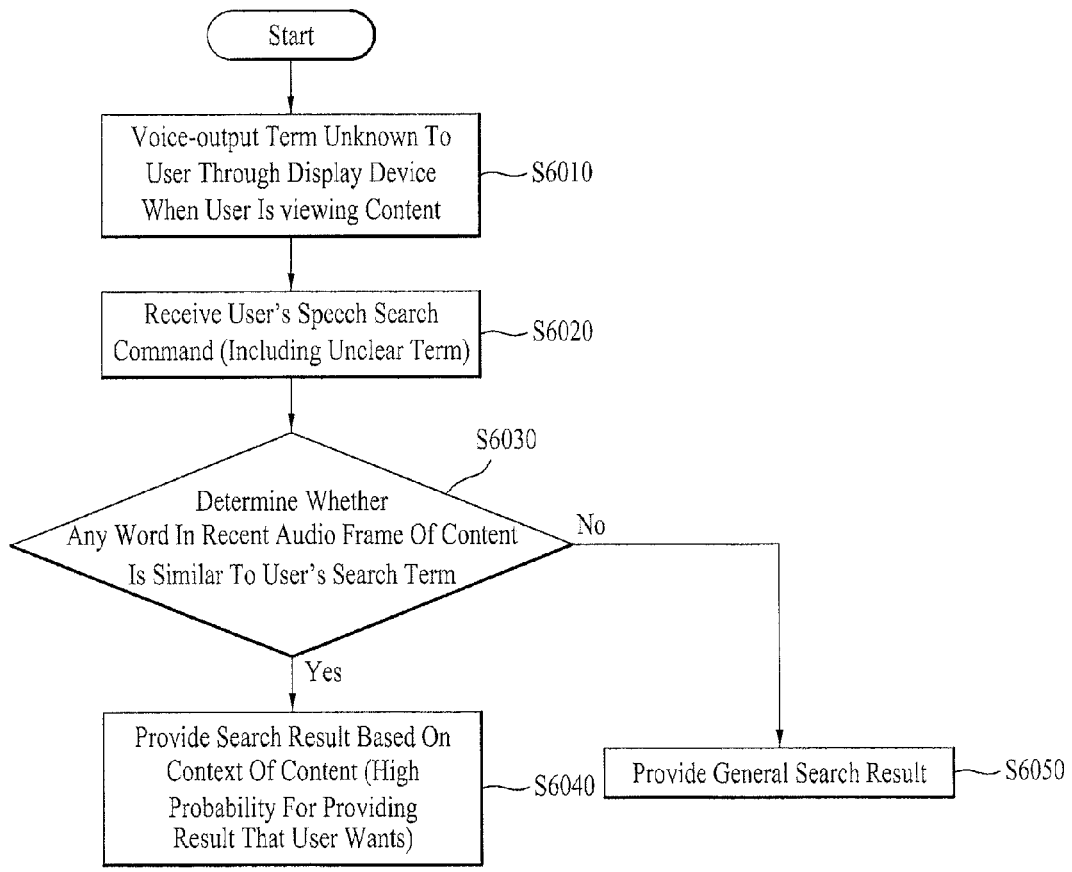
FIG. 6 illustrates a flowchart of a speech search method according to another embodiment of the present invention.

FIG. 6 shows a speech search method according to another embodiment of the present invention that may be performed by any device described herein.

As seen in FIG. 5, an unfamiliar term can be outputted through the display device, when a user is watching contents S6010. According to an example shown in FIG. 5, when the user is watching baseball contents, the contents includes audio " . . . a mid-fielder ends the inning with a fly-out" in the broadcast and the user is not familiar with "fly-out."

The user can tell a speech search command (S6020). In that case, such a speech search command may include an unclear speech command. According to an example in FIG. 5, the user may say, "fl . . . what?" "fl . . . " is an unclear term and may not be recognized as a query word.

The display device determines whether recent audio frames of contents have a similar term to the term that the user wants to search for (S6030). For example, the display device by using Voice-recognition and natural language processing determines from the user's speech search command of "fl . . . what?" that the "what?" is the part of the user's speech search command and the "fl . . . " is the object of it. However, the display device does not directly search for "fl . . . " according to FIG. 3 and FIG. 4. The display device determines that "fl . . . " is not a full term and searches a query term which the user might want to search from the recent audio data. If the display device converts the recent audio data by voice-recognition or to text, the "fly-out" can be searched. Thus, the display device may determine that the query word "fl . . . " is the query word for searching the query term "fly out."

The display device may provide search result which is based on the context of the content (S6040), or may provide general search result which is not based on the context of the content (S6050).

In the above description, we have explained with the example of "fl . . . what" as a case of the speech search command including an incomplete search term. However, the user may utter various speech search commands in various forms including various search words. Thus, when the display device determines a query term matching a query word from the audio data of the contents, the display device provides the result of searching with the determined query term (S6040). If the display device determines that there is no query term matching the query word, the display device diligently searches for the received query word and provides with the result (S6050).

The operation of a display device according to another embodiment in FIG. 5 and FIG. 6 will be further described below.

Figure 7:
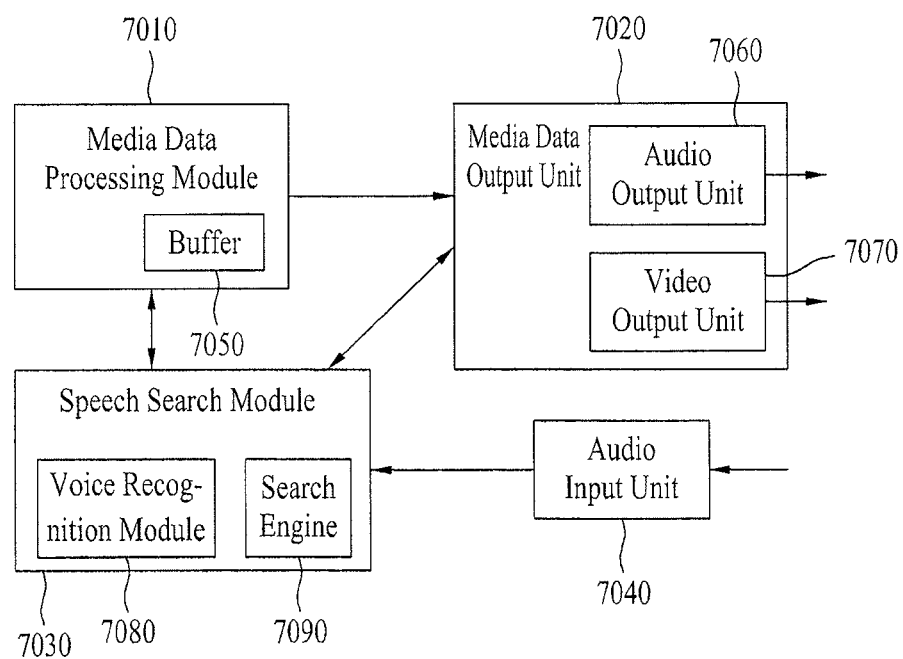
FIG. 7 illustrates a logical block diagram of a display device according to an embodiment of the present invention.

FIG. 7 shows a logical block diagram of the display device according to an embodiment of the present invention.

In FIG. 7, the display device includes a media data processing module 7010, a media data output unit 7020, a speech search module 7030, and an audio input unit 7040. The media data processing module 7010 and the speech search module 7030 may be included in the control unit or be an application operated in the control unit 2100 of the FIG. 2.

The media data processing module 7010 may process media data which includes at least one of text data, audio data and video data. The media data processing module 7010 can decode media data and output the decoded media data to the output unit. According to an embodiment, the media data processing module 7010 may be equipped with a buffer 7050 and store a certain amount of the processing media data in the buffer 7050. The buffer 7050 may be included in the storage unit 2010 shown in FIG. 2. The media data processing module 7010 can process media data by streaming or process the pre-stored media data.

The media data output unit 7020 can output the media data processed in the media data processing module 7010. The media data output unit 7020 may include an audio output unit 7060 and a video output unit 7070 and they output the processed media data in audio and video respectively. The video output unit 7070 outputs images of the processed media data and they include visual data such as video clips, still shots, and texts. According to an embodiment of FIG. 2, the audio output unit 7060 may be included in an audio input/output unit 2040 and the video output unit 7070 may be included in the display unit 2060. Also, as mentioned, if the display device does not include additional output devices like a set-top box, the audio output unit 7060 and the video output unit 7070 may output the processed media data in audio and video.

The audio input unit 7040 receives audio from outside of the display device and transmits it to the speech search module 7030 like a microphone.

The speech search module 7030 performs the speech searching method according to an embodiment of the present invention. The speech search module 7030 receives a user's speech search command through the audio input unit 7040. The speech search module 7030 receives the media data from the buffer 7050 included in the media data processing module 7010. The speech search module 7030 includes a voice recognition module 7080 which recognizes the user's voice, analyzes its meaning, and extracting a query word or a query term.

The speech search module 7030 recognizes and analyzes the user's speech search command by using the voice recognition module 7080. The voice recognition module 7080 can perform natural language processing, process audio data and convert it to text data. The voice recognition module 7080 determines whether a query word included in the user's speech search command is a searchable and full query term. If it determines that it is a searchable and full query term, the voice recognition module provides with the result of searching with the query term by using the search engine 7090. The search result can be transmitted to the media data processing module 7010 or straight to the media data output unit 7020 and then be outputted to the user. The search engine 7090 can perform the search by using a data base equipped in the display device or transmit the query term to the external search engine 1020 as shown in FIG. 1 and receive the result.

When the speech search module 7030 determines that at least one query word included in the speech search command is not a full (or complete) query term, the audio data from the buffer 7050 included in the media data processing module 7010 will be received and processed by the voice recognition module 7080. The speech search module 7030 receives the buffered audio data of a predetermined period of time from the time of the user's speech search command being received and can convert it to text data. The processed result is analyzed with the query word and a full query term that the user intended will be extracted. And the search engine 7090 may perform searching by using the extracted query term and outputs the result.

The speech search module 7030 can generate context information. The context information indicates information about media data that is being currently processed and outputted. First, the context information includes information about contents that can be extracted from the metadata or the metadata of the context that is being currently outputted. Also, the context information includes content related information which is extracted from the predetermined interval of the media data. The speech search module 7030 as mentioned can extract the audio data of the media data and converts it to text. The converted text data also are included in the context information. The result of such processed audio data and the text information may be called as audio-related information of the media data and the audio-related information may also be included in the context information.

The speech search module 7030 may further include an image processing module. The image processing module can process the outputted images of the media data. For example, the image processing module analyzes images outputted from the video output unit 7070 and extracts information about the images. The result of the analyzed images may be called as the image related information of the media data, and the image related information may also be included in the context information.

Figure 8:
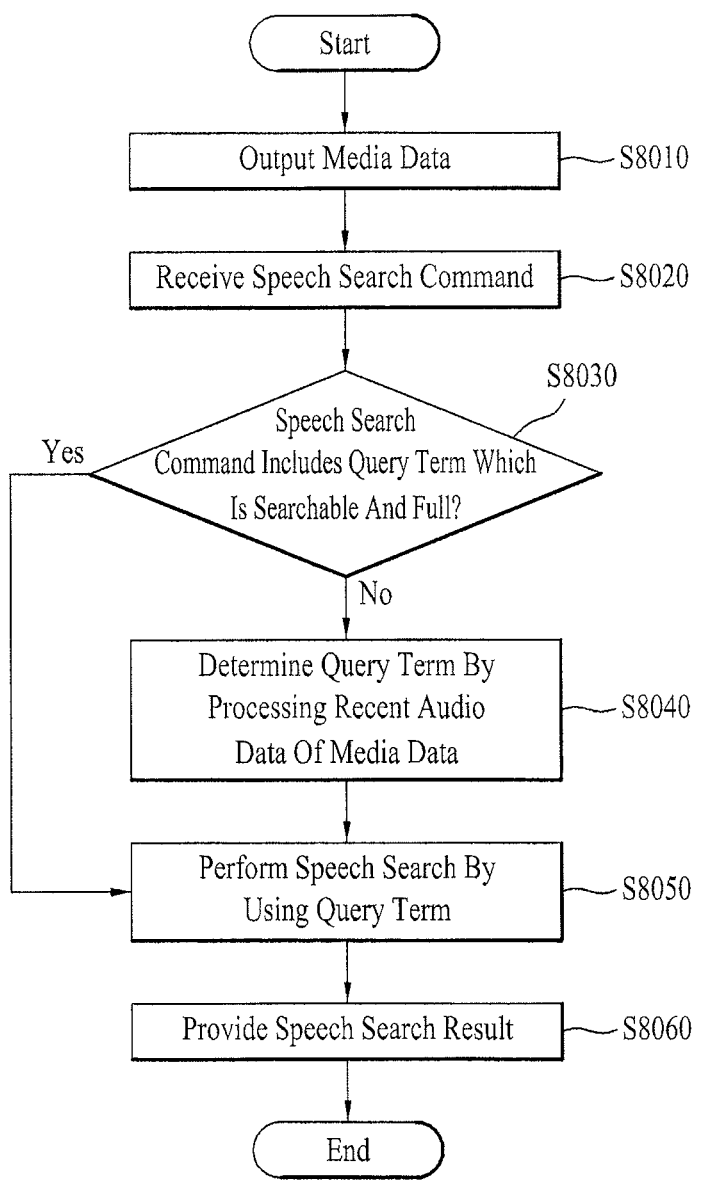
FIG. 8 illustrates a flowchart of a speech search method according to another embodiment of the present invention.

FIG. 8 shows a flowchart for a speech search method according to another embodiment of the present invention that may be performed by any device described herein.

As for FIG. 8, the same descriptions as shown in FIG. 4 are omitted.

The display device outputs media data (S8010). As shown, the media data include video data and audio data or text data depending on the contents.

The display device receives speech search commands (S8020). The speech search command that the display device received may include at least one query word. The speech search command can be a predetermined command or a natural command as normal every conversation statement by using natural language processing. According to an embodiment in FIG. 5, "fl . . . what?" is a speech search command and "fl . . . " is a query word. Also, the speech search command like "what just now?" may not include any query word. As for such case, next steps will be further illustrated with FIG. 9.

The display device determines whether a speech search command includes a query term which is searchable and full (S8030).

In other words, the display device determines whether the speech search command includes a searchable full query term by using at least one query word included in the speech search command. The display device determines whether the query word in the speech search command is the complete search word that the user wants to search with. For example, according to the embodiment in FIG. 5, the user may say the speech search command as "fl . . . what?" or "fly . . . what?" In that case, the display device can determine that the search term with which the user wants to search is "fl" or "fly" or "fly out" by using the user's accent, pronunciation, or context information of the media data.

The display device determines whether the query word is the searchable full query term based on the user's pronunciation, accent and mumbling. In general, users pronounce unfamiliar words differently than familiar words. Especially, for the unfamiliar words, the user's accent is unclear or they mumble the end of the words. The display device notices the pronunciation patterns for those words and determines whether the display device should search with the query word or should find a searchable full query term.

Also, the display device determines based on the context information whether the query word is a searchable full query term. As well, the display device can use both the user's pronunciation patterns and context information.

The context information is information extracted from media data and includes information about the contents that are being currently outputted to the user. For example, the media data includes at least one text data, audio data, video data and metadata. The metadata is data about the media data and includes information of title, genre, story, scene, schedule, character, and time. The context information is information related to the media data, and especially the contents that the user is watching. In the embodiment, if the media data displays baseball contents, the metadata can indicate that the contents are related to a sport and the sport is baseball. Also, the display device discovers that the contents are baseball-related by analyzing and extracting from the audio, images, texts of the media data. In that case, the display device would rather find "fly-out" as a query term that the user wants to search with than just "fly." The display device determines the above by using the context information and comparing the query word with a baseball-related data base.

Context information includes at least one of the metadata of media data, the audio-related information of media data, and the image-related information of media data. The metadata of media data includes at least one of the name, genre, character, scene, and schedule information of the contents.

When at least one query word is not a full query term, the display device processes the recent audio data of media data and extracts a query term (S8030).

The display device receives from and voice-recognizes the audio data stored in the buffer of a predetermined period of time from a time of the user's speech search command being received. And the display device extracts a query term matching the query word by comparing the texts with the user's query word, the text being voice-recognized result of the audio data.

For example, a minute of the audio data from the time of the user saying "fl . . . what?" can be read from the buffer, voice-recognized and converted to text data. Such generated text data can also be called as the context information. The text data will include "a midfielder ends the inning with a fly-out" near the time of the user giving the speech search command. Thus, the display device understands that the query word is not "fl . . . " but "fly-out" that the user intended to search with and the full query term, "fly-out," will be extracted. In other words, the display device determines that the query term is "fly" or "fly-out" that matches the query word "fl . . . " and that the "fly-out" is the query term that the user intended to search with by using the context information. In the example above, the text data as context information includes "a mid-fielder . . . with fly-out" and the query term will be determined that the "fly-out" is the object of the search by analyzing the arrangements of words (e.g. the nouns and prefixes) of the speech search command.

The display device performs searching by using the extracted query term (S8050). The display device searches information about the query term with the internal search engine or transmits the query term through a network to the external search engine having the search function and receives the result of the search. The search or the search result of the query term includes the definition of the term and diverse data related to contents which the user is watching.

The display device provides a user with the search result (S8060). The search result can be provided in various ways. For example, the display device provides the search result as audio or as display output. In other words, the display device outputs the result to the user in voice or in caption on a display screen.

Depending on an embodiment, S8030 step may include S8040. That is, in the step of determining the query term, recent audio data can be processed and audio related information can be generated. The audio related information may be included in the context information as mentioned. The display device may determine the query term by comparing and analyzing the context information with the query word.

Context information includes processed media data information in addition to media data. The display device can process a part of the media data being outputted and as for the audio data, it is as pre-described. The display device image-processes a predetermined time amount of video data and extracts image related information about the media data for that amount. In the above-mentioned embodiment, by using image processing, the display device may determine that content that is currently being displayed is baseball image. Especially when a user searches for a player's name or information, "what is the number four hitter's name?" as an example can be a speech search command. In that case, the display device obtains the image information about the number four hitter by performing image processing for the video data and obtains additional information about him by the image searching technology. In that case, the display device may include an image processing module in addition to the units shown in FIG. 7. The image processing module processes and analyzes video data stored in the buffer. Also, in this case, the search engine of the display device receives image information from the image processing module and performs image searching for the image information.

Figure 9:
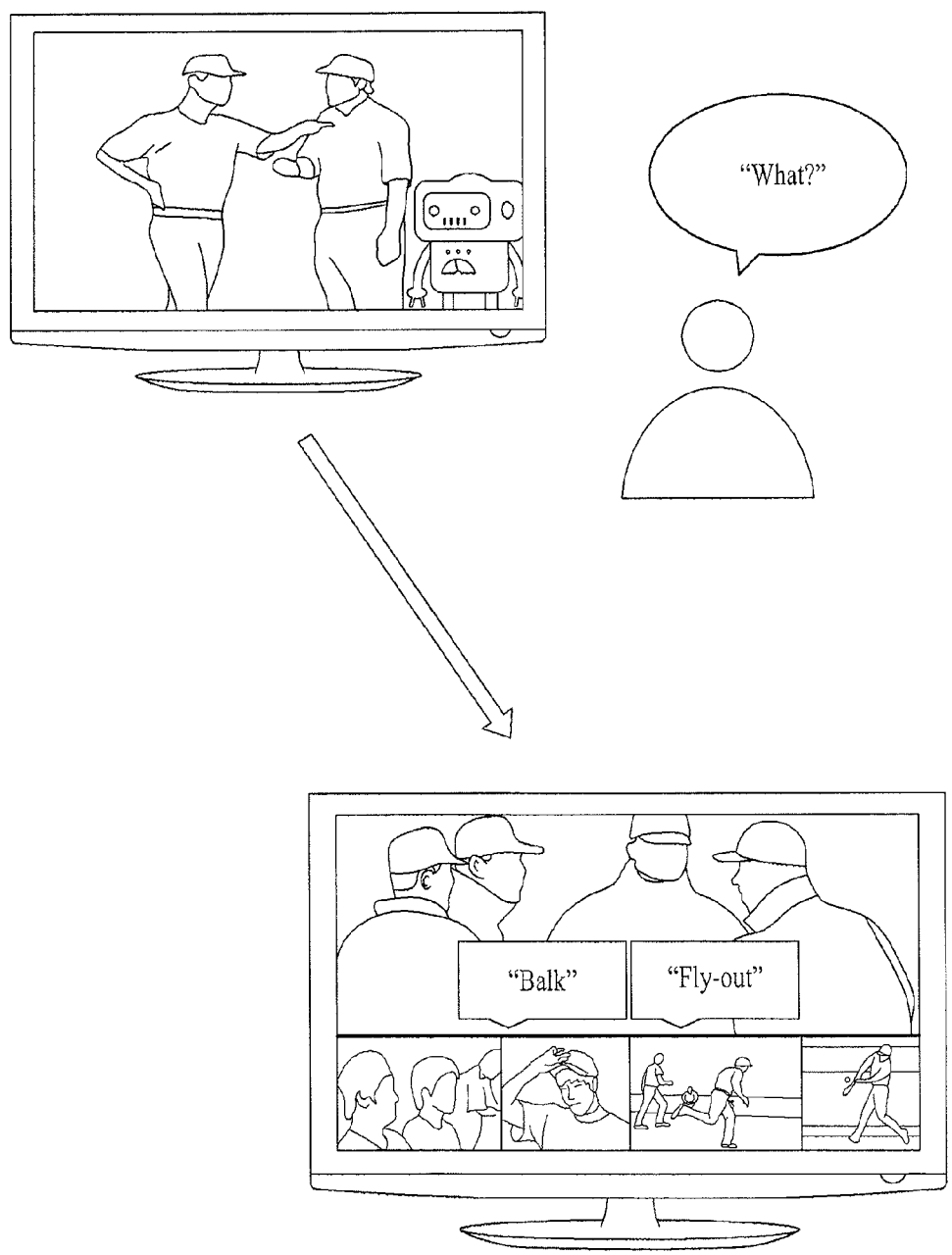
FIG. 9 illustrates a speech search method according to another embodiment of the present invention.

FIG. 9 shows an example of a speech search method according to an embodiment of the present invention that may be performed by any device described herein.

In FIG. 8, it may occur that a query term which matches to a query word cannot be determined or a query word itself is also unclear. Further, as shown in FIG. 9, a user's speech search command does not include any query word (e.g., "what?"). The display device can provide query term candidates to the user even in that case as shown in FIG. 9.

The query term candidates can be any term of a predetermined period of time from the time of the user giving the speech search command. For example, audio data of thirty seconds from the time of the user giving the speech search command is voice-recognized, searchable terms are extracted, and they are displayed in a chronological order by the display device. In that case, the images of the time when the terms being outputted may be read from the buffer and may be displayed in form of thumb nail images. Not only the audio data but also the video data processed can be stored in the buffer as above-mentioned. The user can select a query term from the query term candidates and start the search with it. The query term selection can be performed by a remote control, an voice input, a gesture input, and etc.

FIG. 9 shows an embodiment of displaying query term candidates but the display device can output them in audio.

Providing query term candidates in FIG. 9 can be performed together with the steps of S8030 to S8050 in FIG. 8. In that case, the S8030 step determines whether the query word exists and the query word is a searchable full query term at the same time. If a query word is not obtained or does not exist, the display device in the step of S8040 extracts at least one query term candidate, provides the user with it, and receives the user's choice for it.

As described with reference to FIG. 8 and FIG. 9, if it is difficult for the display device to determine the query term, the display device can offer the user the query term candidate and receives the user's choice for it. Also, in between the steps of S8040 and S8050 shown in FIG. 8 and FIG. 9, the display device can provide a confirmation request for the determined query term to the user. When the confirmation request is received by the user's remote control, audio, or gesture inputs, the display device performs the search with the determined query term and provides the search result. When the user does not confirm or confirms that the query term is not the one that the user intended, the display device can provide additional query term candidates to the user.

For example, in the embodiments of FIG. 5 and FIG. 9, the display device recognizes "fl" as a query word and "fly" as a query term. In that case, the display device can output a confirmation request as "would you like to search with "fly"?" The confirmation request can be outputted with a pop-up window displaying "Yes" and "No." When the user replies to the confirmation request by inputting "Yes," the display device can perform the search with "fly" and provide the search result. When the user replies to the confirmation request by inputting "NO" or not inputting anything for a predetermined period of time, the display device reviews the context information and provides at least one query term candidate. And when the user selects one query term from the at least one query term candidate, the display device performs the search with the selected query term and provides the search result.

Further, a plurality of query term candidates for the query word from the context information can be extracted and provided. For example, "fly" and "fly-out" can be displayed and provided to the user. The selected query term by the user will be performed the search.

That is, by the embodiment above, the display device can offer the selected query term and send a confirmation request for the selected query term in addition to offering the query term candidates to the user. By doing so, the display device can avoid providing a search result of an unwanted search term. Furthermore, while the concepts discussed above relate to simple words (e.g., fly) or phrases (e.g., fly-out), the embodiments are not limited to simple words or phrases. That is, in some embodiments, entire query sentences may be deduced based on context and/or search history. In some embodiments, any search history may be based on historic searches performed by the local device and/or for a specific user. In other embodiments, search histories used to develop the query term/phrase may be based on search histories or search trends from Internet-based social media. That is, a query word may be "Titanic" and the proposed query term that is based on a social media search history or search trend may be "Who starred in Titanic?" Also, the proposed query term may be a list of query terms such as: "Who starred in Titanic?" "Who directed Titanic?" "When did Titanic sink?"

Thus, according to the speech search method of the present invention, information about audio and video that have already passed from the contents that a user is watching can be conveniently searched. Especially, when the user does not recognize a search object accurately, the optimized search result of the media data that the user is watching can be provided by using the user's pronunciation patterns and context information.

Although the user's speech search command includes an unclear query word or does not include a query word, the present invention provides the optimized search result. Also, when it is difficult to determine the search object that the user intends by even using the non-full or incomplete query word or the context information, the user can select a query term that he or she wants to search for from query term candidates of a predetermined period of time suggested by the display device.

The invention claimed is:

1. A speech search method performed by a display device, the method comprising:
outputting media data including audio data;
receiving a speech search command for additional data about the outputted media data from a user, the speech search command including at least one query word;
determining whether the at least one query word matches a query term that is full and searchable based on pronunciation patterns of the user;
when the at least one query word matches the query term that is full and searchable and the pronunciation pattern is a first pattern, performing a search for the additional data using the query term; and
when the at least one query word does not match the query term that is full and searchable and the pronunciation pattern is a second pattern, determining the query term from a predetermined amount of the audio data prior to receiving the speech search command and performing the search for the additional data using the query term,
wherein the first pattern means at least one of that the user's accent is clear and that there is no mumbling in the user's pronunciation, and
wherein the second pattern means at least one of that the user's accent is unclear and that there is mumbling in the user's pronunciation.

2. The method of claim 1, wherein the context information comprises at least one of title information, genre information, character information, scene information, schedule information, audio related information, and image related information of the media data.

3. The method of claim 1, wherein the step of determining the query term from the predetermined amount of the audio data comprises:
voice-recognizing the predetermined amount of the audio data;
extracting at least one query term candidate from a corresponding voice recognition result; and
determining the at least one query word that matches the query term that is full and searchable from the at least one query term candidate.

4. The method of claim 3, the method further comprising:
outputting the at least one query term candidate when the at least one query term candidate does not match the at least one query word.

5. The method of claim 1, wherein the step of determining the query term from the predetermined amount of the audio data comprises:
voice-recognizing the predetermined amount of the audio data;
extracting at least one query term candidate from a corresponding voice recognition result;
outputting the at least one query term candidate; and
receiving a command for selecting the query term from the at least one query term candidate.

6. The method of claim 5, wherein the outputting step of the at least one query term candidate comprises
providing the user with the at least one query term candidate in a chronological order; and
providing the user with an image of the media data while the at least one query term candidate being outputted.

7. The method of claim 1, wherein the step of performing the search further comprises:
providing the user with a confirmation request for the determined query term; and
when the determined query term is confirmed by the user, performing the search using the confirmed query term.

8. The method of claim 1, wherein the step of determining whether the at least one query word matches the query term that is full and searchable further comprises:
determining whether the at least one query word corresponds to the full and searchable query term or a partial query term.

9. A display device, comprising:
a media data processing module configured to process media data;
a media data output unit configured to output the processed media data;
an audio input unit configured to receive a speech search command for additional data about the outputted media data from a user, the speech search command including at least one query word; and
a processor configured to
determine whether the at least one query word matches a query term that is full and searchable based on pronunciation patterns of the user,
when the at least one query word matches a query term that is full and searchable and the pronunciation pattern is a first pattern, perform a search for the additional data using the query term, and
when the at least one query word does not match the query term that is full and searchable and the pronunciation pattern is a second pattern, determine the query term from a predetermined amount of the audio data prior to receiving the speech search command and perform the search for the additional data using the query term, wherein the first pattern means at least one of that the user's accent is clear and that there is no mumbling in the user's pronunciation, and wherein the second pattern means at least one of that the user's accent is unclear and that there is mumbling in the user's pronunciation.

10. The display device of claim 9, wherein the context information comprises at least one of title information, genre information, character information, scene information, schedule information, audio related information, and image related information of the media data.

11. The display device of claim 9, wherein the processor is further configured to voice-recognize the predetermined amount of the audio data;

extract at least one query term candidate from a corresponding voice recognition result; and determine the at least one query word that matches the query term that is full and searchable from the at least one query term candidate.

12. The display device of claim 11, wherein the processor is further configured to output the at least one query term candidate when the at least one query term candidate does not match the at least one query word.

13. The display device of claim 9, wherein the processor is further configured to voice-recognize the predetermined amount of the audio data;

extract at least one query term candidate from a corresponding voice recognition result;

output the at least one query term candidate; and receive a command for selecting the query term from the at least one query term candidate.

14. The display device of claim 13, wherein the processor is further configured to provide the user with the at least one query term candidate in a chronological order; and provide the user with an image of the media data while the at least one query term candidate being outputted.

15. The display device of claim 9, wherein the processor is further configured to provide the user with a confirmation request for the determined query term; and when the determined query term is confirmed by the user, perform the search using the confirmed query term.

16. The display device of claim 9, wherein the processor is further configured to determine whether at least one query word corresponds to a full and searchable query term or a partial query term.

* * * * *